(12) United States Patent
McGrath et al.

(10) Patent No.: US 6,199,328 B1
(45) Date of Patent: Mar. 13, 2001

(54) CLAMP ASSEMBLY FOR ATTACHING PANELS TO SUBSTRATE

(75) Inventors: Ralph D. McGrath; Frank C. O'Brien-Bernini, both of Granville, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/209,307

(22) Filed: Dec. 11, 1998

(51) Int. Cl.[7] ....................................................... E04B 1/61
(52) U.S. Cl. .................. 52/127.1; 52/506.05; 52/509; 52/698; 52/DIG. 13; 52/584.1
(58) Field of Search .......................... 52/127.1, 506.05, 52/509, 698, DIG. 13, 584

(56) References Cited

U.S. PATENT DOCUMENTS

| 2,618,145 | * | 11/1952 | Sinner et al. ............. 52/506.05 X |
| 3,778,942 | * | 12/1973 | Bondi ................................. 52/509 X |
| 4,150,464 | | 4/1979 | Tracy . |
| 4,439,973 | | 4/1984 | Nassof . |
| 4,522,284 | | 6/1985 | Fearon et al. . |
| 4,648,738 | | 3/1987 | Thielen . |
| 4,898,493 | | 2/1990 | Blankenburg . |
| 5,058,245 | | 10/1991 | Saito . |
| 5,299,402 | | 4/1994 | Lee . |
| 5,375,286 | | 12/1994 | Harrah . |
| 5,537,793 | * | 7/1996 | Murasaki ................ 52/DIG. 13 X |
| 5,946,874 | * | 9/1999 | Roberts ........................... 52/698 X |

FOREIGN PATENT DOCUMENTS

| 0 641 939 A1 | 3/1995 | (EP) . |
| 1 053 476 | 2/1954 | (FR) . |

OTHER PUBLICATIONS

3M Reclosable Fastening Systems Application Guide, 1998.

* cited by examiner

*Primary Examiner*—Christopher T. Kent
(74) *Attorney, Agent, or Firm*—Inger H. Eckert; Stephen W. Barns

(57) ABSTRACT

A quick and easy technology for attaching, and facilitating reconfiguration (detachment and reattachment) of, panels to walls that uses a clamp assembly including a base, a receptacle attached to the base and a clasp that fits into and attaches to the receptacle. The clasp has resilient arms and a head. Insertion of the resilient arms of the clasp into the receptacle draws the head towards the base, which produces a clamping action. Alternatively, the clamp assembly includes a channel having sidewalls attached to a base and at least one fastener having a blade-like shank and a head. The sidewalls converge so as to be more closely spaced together at the opening of the channel than at its base. The at least one fastener appears T-shaped in cross section, and is sized so that insertion of the blade-like shank into the channel widens the opening. Alternatively, the clamp assembly includes a first clamping piece and a second clamping piece configured to cooperatively engage each other. The first and second clamping pieces include the members of a reclosable fastener pair, such as hook and loop connector pair or strips of mushroom-shaped stems.

13 Claims, 9 Drawing Sheets

CLAMP ASSEMBLY FOR ATTACHING PANELS TO SUBSTRATE

TECHNICAL FIELD AND INDUSTRIAL APPLICABILITY OF THE INVENTION

The invention is directed toward a clamping assembly, and more particularly toward a clamping assembly for attaching panels to a substrate such as a wall.

BACKGROUND OF THE INVENTION

For some rooms in a building, it is desirable to control sound transmission. Such rooms include home theaters, recording studios and offices in which confidential conversations take place. In such an office, the control of sound transmission takes the form of sound proofing to prevent the escape of intelligible conversation from the room. This is true to a lesser extent with the home theater or recording studio, where the emphasis is on controlling the sonic quality inside the room.

An approach to control sound transmission is to attach acoustically significant panels, be they absorbers or diffusers, to the room's surfaces. Examples of such acoustically significant panels are disclosed in copending U.S. patent application Ser. No. 08/871,021, filed Jun. 6, 1997, on behalf of McGrath et al. and entitled "Acoustical Room Paneling and Method of Installation," the entire contents of which are hereby incorporated by reference.

To initially tune a home theater or a recording studio, the walls and/or ceiling must, at first, be covered by the panels. Then, it is usually necessary to change at least a few panels from being acoustical absorbers to acoustical dispersers/diffusers and/or vice-versa. This requires removing the fasteners from the first panel and reinstalling them through either the first panel after it has been reversed or an entirely different second panel.

Typically, the panels are attached using conventional fasteners, e.g., drywall screws in rooms having walls formed of drywall attached to studs. Drilling pilot holes in the panels for such screws or screwing through the panels causes minor damage to the panels. Screwing, unscrewing and rescrewing panels is time consuming and protracts the process of tuning a room.

Nor is this the last time that such an attaching/detaching process is likely to be required. If someone changes the furniture and/or window treatments in the home theatre, the room should be retuned. Such redecoration is likely to occur a only few times, at most. In a recording studio, however, the need for retuning can arise daily, and possibly more frequently. For example, if a recording studio is tuned for vocal sessions on Monday, then it should be retuned for string sessions on Tuesday, retuned for percussion sessions on Wednesday, etc.

Not all recording studios are permanently constructed. Temporary recording studios are becoming more prevalent. A musical group might wish to record in an ancient castle or at a remote location because of the location's ambience. A temporary recording studio can significantly improve the quality of the recording. Important to the success of a temporary recording studio is its ease of assembly/disassembly. The need for easy attachment/detachment of panels, as discussed above, contributes greatly to the ease of the temporary recording studio's assembly/disassembly. Moreover, a temporary recording studio, once assembled, is as likely to be reconfigured to accommodate different recording sessions as a permanently constructed recording studio.

SUMMARY OF THE INVENTION

The invention, among other things, represents a recognition that a better technology for attaching/detaching panels to substrates (such as walls) is needed.

The invention, among other things, represents a recognition that quick and easy reconfiguration of panels on walls can be provided by a clamp assembly for attaching the panels to the walls.

The first and second embodiments of the invention, among other things, provide a clamp assembly including a base, a receptacle attached to the base and a clasp that fits into and attaches to the receptacle. The clasp has resilient arms and a head. Insertion of the resilient arms of the clasp into the receptacle draws the head towards the base, which produces a clamping action.

A third embodiment of the invention, among other things, provides a channel having sidewalls attached to a base and at least one fastener having a blade-like shank and a head. The sidewalls converge so as to be more closely spaced together at the opening to of the channel than at its base. The at least one fastener appears T-shaped in cross section, and is sized such that insertion of the blade-like shank into the channel widens the opening.

The fourth and fifth embodiments of the invention, among other things, provide a clamp assembly comprising a first clamping piece and a second clamping piece configured to cooperatively engage each other. The first clamping piece has a base plate, a first shank attached to extend perpendicularly to the base plate and a first member (of a reclosable fastener pair) attached to the first shank at an end distal to the base plate. The second clamping piece has a head plate, a second shank attached to extend perpendicularly to said head plate and a second member (of the reclosable fastener pair) attached to the second shank at an end distal to the head plate. The base plate and the head plate are parallel when the first member and second member are connected.

In the fourth embodiment, each of the first member and second member is a strip of mushroom-shaped stems. In the fifth embodiment, the reclosable fastener pair is a hook and loop fastener pair.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit of the present invention and wherein.

DETAILED DESCRIPTION AND PREFERRED EMBODIMENTS OF THE INVENTION

Figure 1:
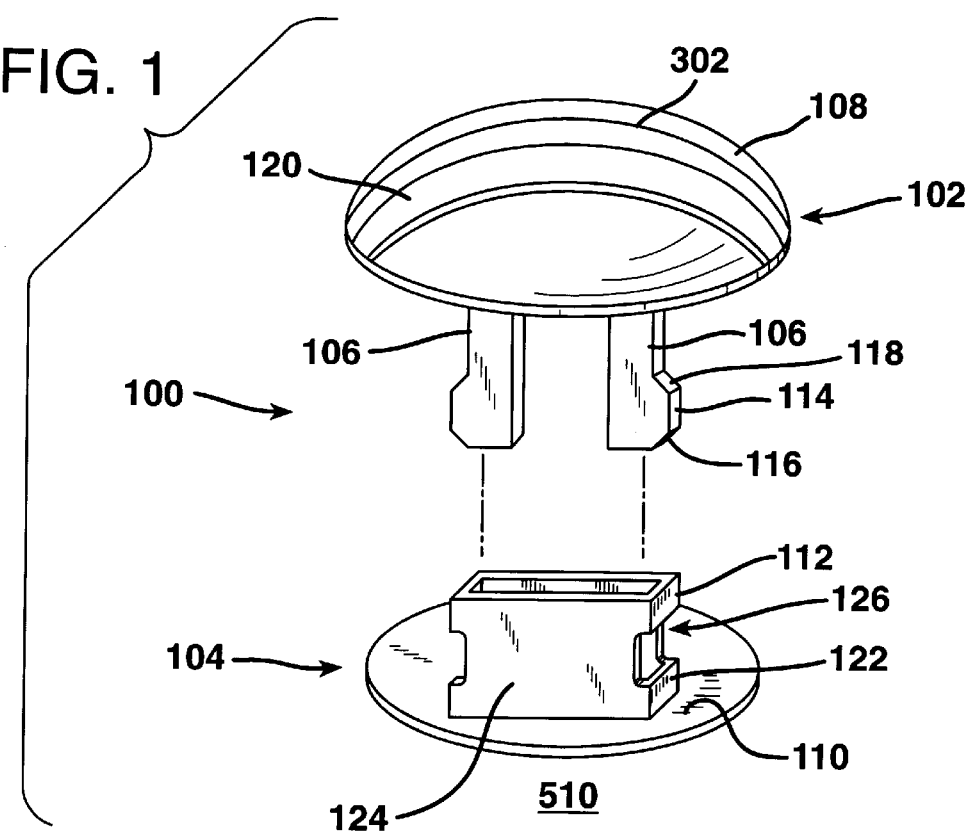
FIG. 1 is a three-quarter perspective view of a first embodiment of a clamp assembly according to the invention.

FIG. 1 is a three-quarter perspective view of a first embodiment of a clamp assembly 100 according to the invention, which includes a lower clamp structure 104 (represented by a base 110 and a receptacle 112) and a clasp 102 that interlock.

The clasp 102 has resilient arms 106 and a head 108. In cross-section, the head 108 is preferably plano-convex. The resilient arms 106 attach to the planar side of the head 108. The head 108 preferably (but not necessarily) has a finger grip 120 in the form of a ridge. The cross-section of the ridge is a compromise between finger-tip-grippablility and smoothness of the upper surface of the head 108.

The technology of the interlock between the receptacle 112 and the resilient arms 106 is generally known, for example as disclosed in U.S. Pat. No. 4,150,464 to Tracy et al., patented Apr. 24, 1979, the entirety of which is hereby incorporated by reference. The resilient arms 106 have a raised locking tab 114. A leading edge 116 of the tab 114 is beveled to promote deflection of the arm 106 toward the other arm 106 upon (and in furtherance of) insertion of the clasp 102 into the receptacle 112. A trailing edge 118 of the tab 114 is beveled to promote deflection of the arm 106 toward the other arm 106 upon (and in furtherance of) withdrawal of the clasp 102 from the receptacle 112.

The receptacle 112 has narrow sides 122 and wide sides 124. In each narrow side 122 is a slot 126. The locking tab 114 fits into the slot 126 upon full insertion of the clasp 102 into the receptacle 112.

Figure 2:
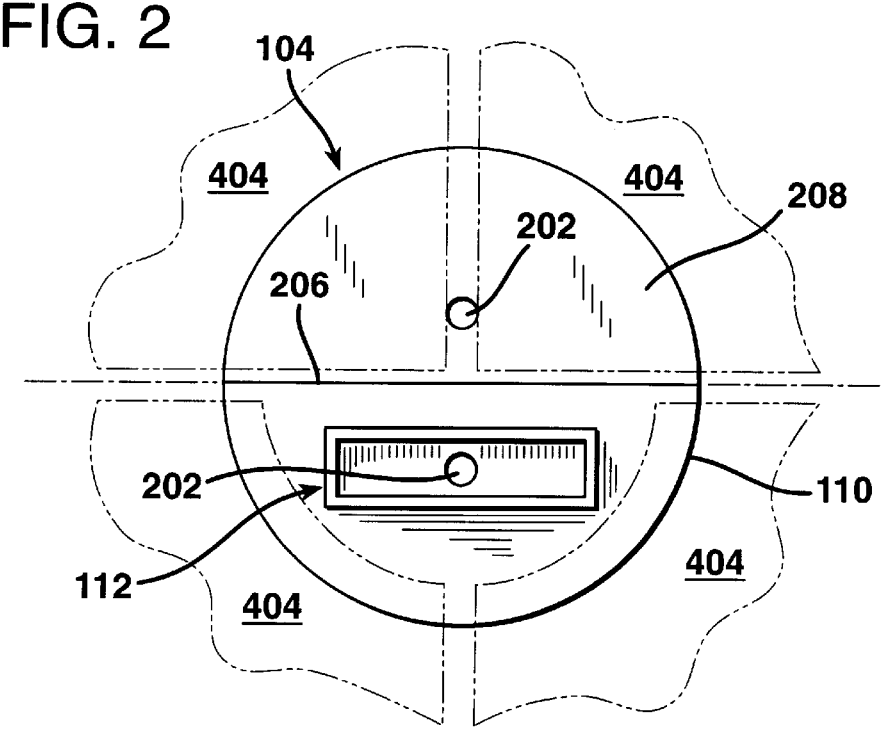
FIG. 2 is a top view of the receptacle and base according to the first embodiment.
Figure 3:
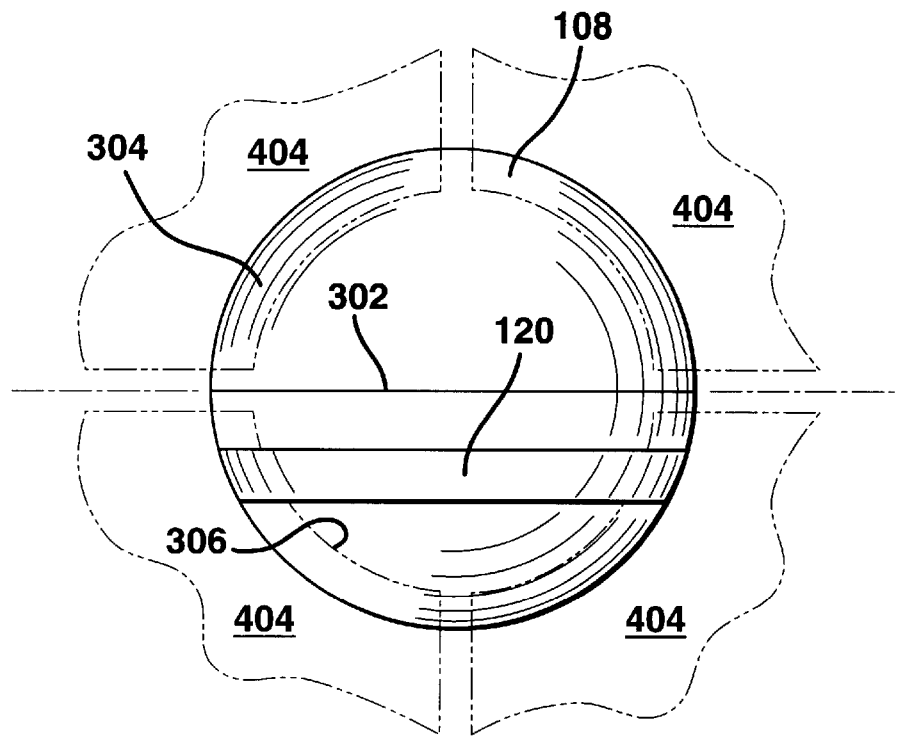
FIG. 3 is a top view of the clasp according to the first embodiment.

The head 108 of the clasp 102 and the base 110 are preferably circular, as emphasized in FIGS. 2 and 3, respectively. FIG. 2 is a top view of the base 110 and FIG. 3 is a top view of the head 108. Holes 202 are formed to facilitate attaching the base 110 to a substrate 510 (such as a wall) with typical fasteners, such as drywall screws or nails. FIG. 2 depicts two holes 202, with one hole on each side of the notch 206. The number and location of holes will depend on the application to which the clamp system 100 is put. Alternatively, the base 110 could be attached to the wall with an adhesive, or a type of reclosable fastener technology such as that discussed in more detail below.

Where four panels meet, space must be made for the arms 106 and receptacle 112. This is accomplished by removing a triangular or cone shaped portion of the corner of each of panels 404. Four such triangles or cones define a square or circle of sufficient area to accommodate the arms 106 and the receptacle 112. FIG. 3 depicts cone-shaped corner portions of the panels 404 as having been removed. FIG. 2 depicts a similar implementation of the panels, albeit in dashed lines because the panels overlay the base 110. The area of the head 108 must be large enough to provide sufficient overlap of the arc-shaped corners 306 so that adequate clamping force is applied to the panels 404.

Figure 11:
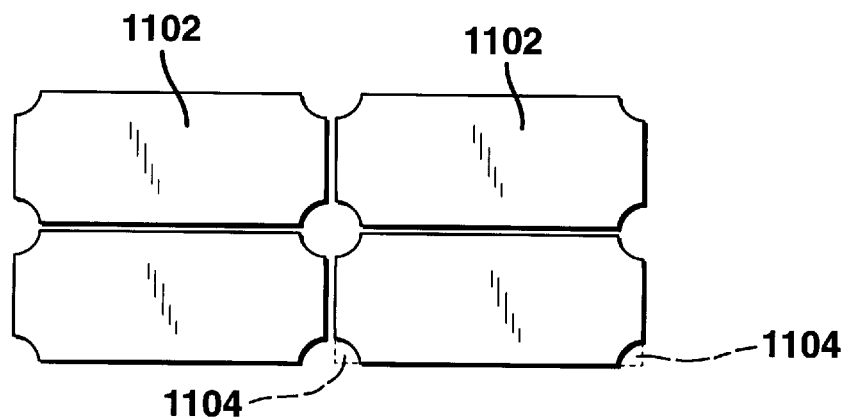
FIG. 11 is a plan view of a plurality of a first type of panels for use with the first and second embodiments.
Figure 12:
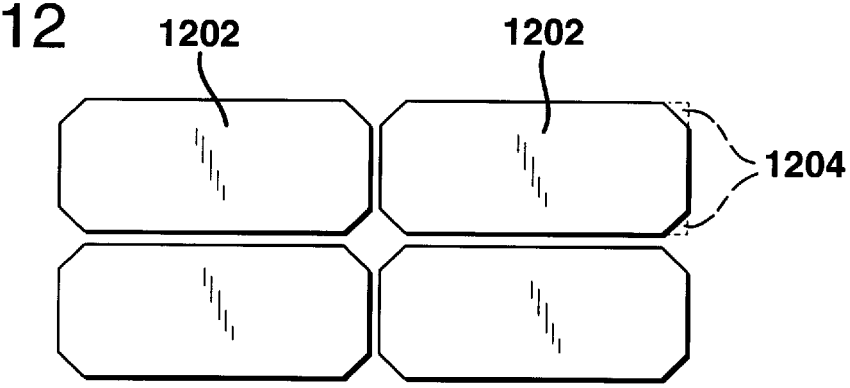
FIG. 12 is a plan view of a plurality of a second type of panels for use with the first and second embodiments.

FIG. 11 is a plan view of a plurality of panels 1102 which have had cone-shaped corner portions 1104 removed. FIG. 12 is a plan view of a plurality of panels 1202 which have had triangular corner portions 1204 removed.

Preferably, but not necessarily, the base 110 and the head 108 have a notch 206 and 302, respectively, that defines an axis of symmetry. The receptacle 112 is positioned entirely on one side of the axis of symmetry 206. Similarly, if the optional finger grip 120 is present, it is positioned entirely on one side of the axis of symmetry 302. The notches 206 and 302 promote the bending and snapping-off of the unused portions 208 and 304 of the base 110 and the head 108 along the axes of symmetry, respectively. This reduces the capacity of the clamp assembly from four to two panels, as will be discussed in regard to FIG. 4.

Figure 4:
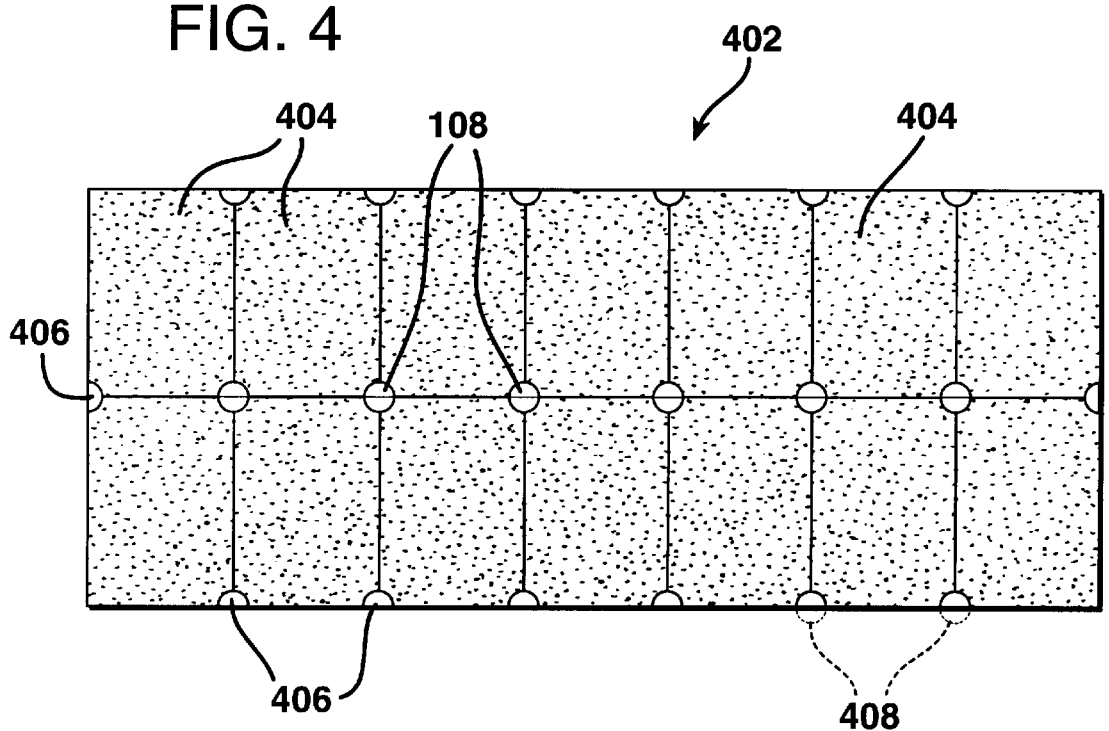
FIG. 4 is a plan view of a plurality of panels attached to the wall using the clamp assembly according to the first embodiment.

FIG. 4 is a plan view of a paneled wall 402 formed of a plurality of panels 404 attached to a bare wall (not depicted in FIG. 4 because obscured by the panels 404 and the heads 102 and 406) using the clamp assembly 100. The full heads 108 are depicted where the corners of four panels 404 are adjacent. A half head 406, formed by snapping off the unused portion 208 of the full head 108, is depicted where only two panels are adjacent. If it were not possible to form a half-head 208 (and associated half-lower-clamp structure 104 (not depicted)), then a full head 108 (and associated lower clamp structure 104) would overhang the edge regions, as denoted by the dashed half circle 408 of FIG. 4.

The clamp assembly 100 is preferably formed of a material that is rigid and that can be injection molded (so that the two pieces of the clamp assembly can be integrally formed). Such a material, e.g., is plastic such as nylon or delrin. If the panel presents an absorptive surface to the room, then a clamp assembly made of nylon or delrin will present a small area of diffusion. However, the area of the head 108 of the clasp 102 is typically a few square inches while the area of a typical 2 ft×4 ft acoustically-significant panel is 1152 square inches, i.e., a difference of three orders of magnitude. As such, the diffusion caused by the head 108 is considered negligible.

Figure 5:
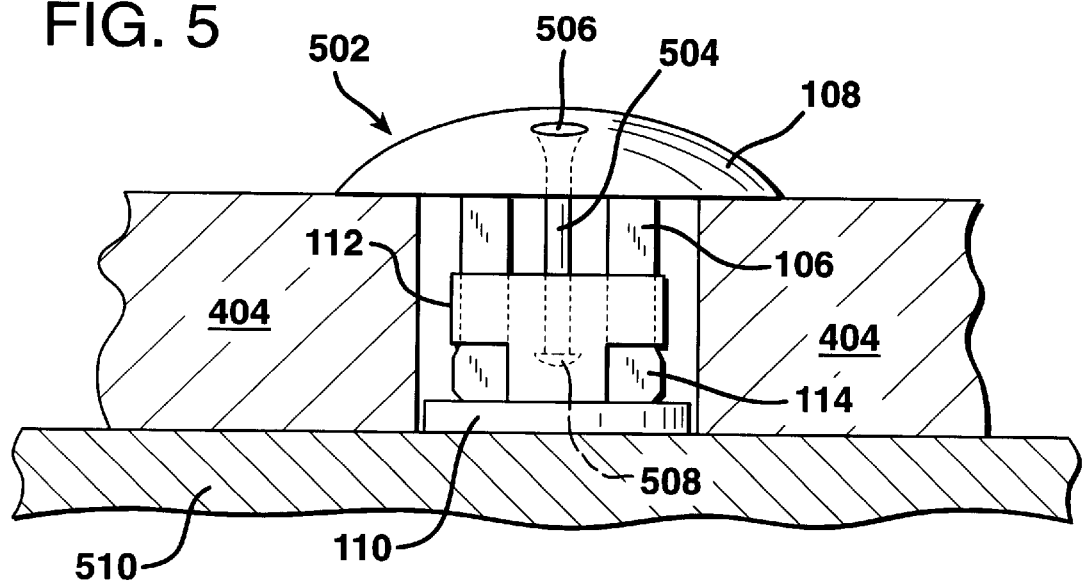
FIG. 5 is a cross-sectional view of a second embodiment, wherein the pull pin is retracted.

FIG. 5 is a side view of a second embodiment. The second embodiment differs from first embodiment by using a pull pin (or movable arm) 504 rather than a finger grip 120. For the clasp 502, the pull pin 504 is located entirely on one side of the axis of symmetry and is movable through the head 108 between a first position and a second position. The first position is the fully retracted position wherein the pull pin 504 extends from the head 108 towards the distal ends of the resilient arms 106. In FIG. 5, a first end 506 and a corresponding recess in the convex surface of the head 108 cooperate in a first detent arrangement to hold the pull pin 504 in the first position.

The second position is the fully extended position wherein the pull pin extends from the head 108 in a direction opposite to the direction that the resilient arms 106 extend. In the first or fully retracted position, a second end 508 of the pull pin preferably hangs down inside the receptacle 112. In the second or fully extended position, the second end 508 of the pull pin 504 and a second recess cooperate in a second detent arrangement to hold the pull pin 504 in the second position. A user can move the pull pin 504 from the first position to the second position by prying the first end 506 out of the recess in the convex surface of the head 108.

Figure 6:
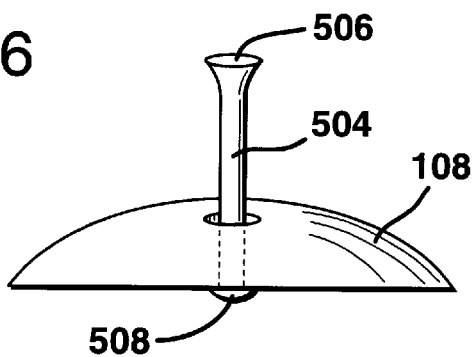
FIG. 6 is a partial cross-sectional view of the clasp according to the second embodiment, wherein the pull pin is extended.
Figure 7:
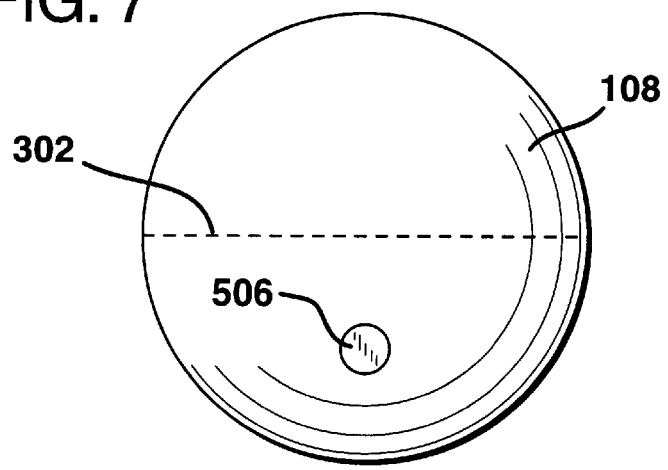
FIG. 7 is a top view of the clasp according to the second embodiment.

FIG. 6 is a partial side view of the clasp 502 according to the second embodiment, wherein the pull pin 504 is in the second or extended position. A user can move the pull pin 504 from the second position to the first position pushing on the first end 506 until the second end 508 disengages from the recess in the planar surface of the head 108. FIG. 7 is a top view of the clasp 502 according to the second embodiment.

Figure 8:
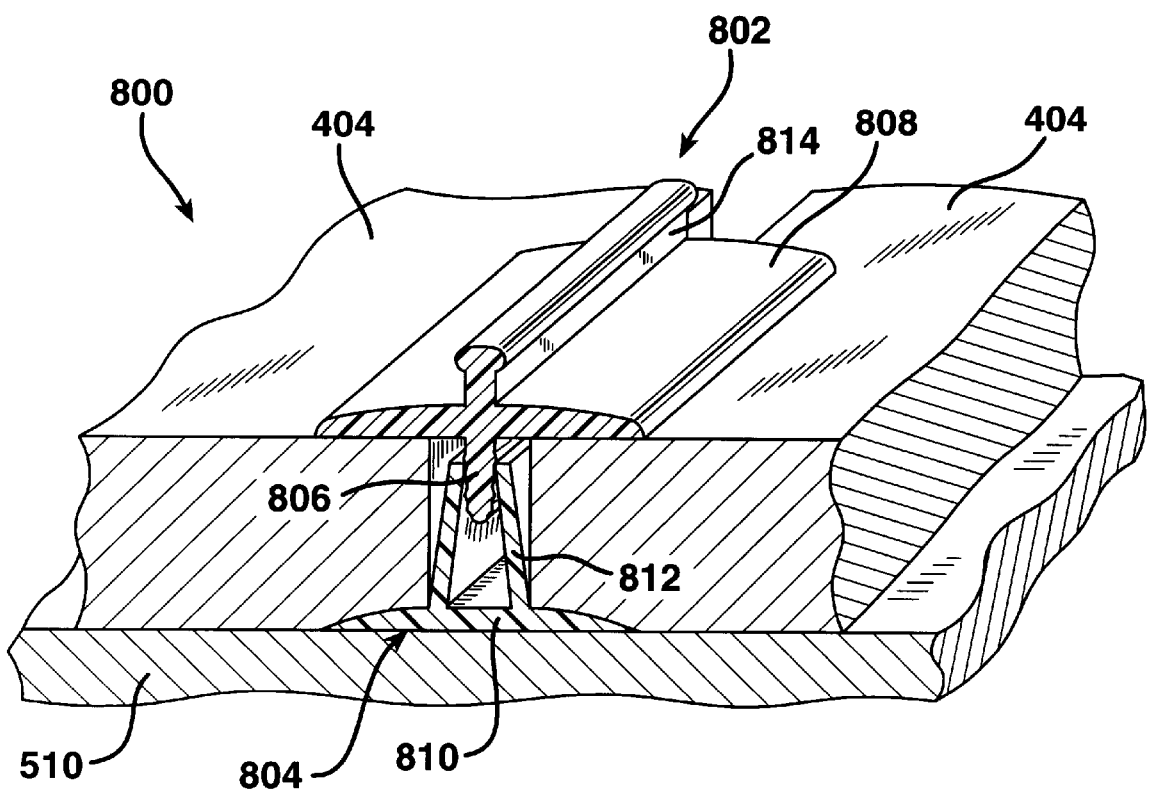
FIG. 8 is a three-quarter perspective view of a third embodiment of a clamp assembly according to the invention.

FIG. 8 is a three-quarter perspective view of a third embodiment of a clamp assembly according to the invention. The clamp assembly 800 includes at least one fastener 802 and a channel 804.

The channel 804 has a base 810 and two sidewalls 812 that converge so that they are more closely spaced together at or near the opening to the channel than they are at the base 810. In cross-section, the base 810 is preferably plano-convex, with the sidewalls 812 extending from the convex surface of the base 810. The plano-convex cross section is preferred because it provides minimal separation between the panels 404 and the bare wall 510.

Figure 13:
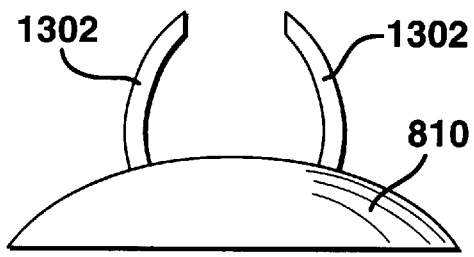
FIG. 13 is cross-sectional of channel having an alternative arrangement of the sidewalls.
Figure 14:
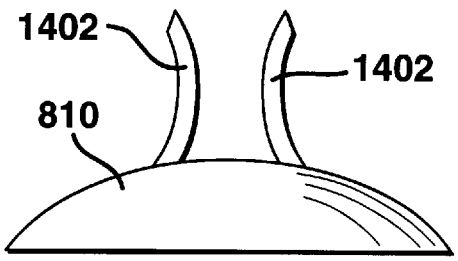
FIG. 14 is a cross-sectional of channel having another alternative arrangement of the sidewalls.

In FIG. 8, the cross-section of the sidewalls 812 and the portion of the base 810 therebetween is trapezoidal. Alternatively, the cross-section of the sidewalls 1302 and the portion of the base 810 therebetween can be concave-concave, as in FIG. 13. Also alternatively, the cross-section of the sidewalls 1402 and the portion of the base 810 therebetween can be convex-convex, as in FIG. 14.

The fastener 802 has a blade-like shank 806 and a head 808. In cross-section, the head 808 is plano-convex, with the shank 806 extending from the planar surface of the head 808 so that together the head 808 and the shank 806 appear T-shaped. The width of the blade-like shank 806 is slightly greater than the width of the opening of the channel 804 between the sidewalls 812 so that the blade-like shank 806 forces the sidewalls 812 apart slightly upon insertion, which causes the sidewalls 812 to grip the blade-like shank 806. To improve the grip on the blade-like shank 806 by the sidewalls 812, the surface of the shank 806 is non-smooth, e.g., ringed.

The width of the head 108 must be large enough to provide sufficient overlap of the edges of the panels 404 so that that adequate clamping force is applied to the panels 404.

Preferably, but not necessarily, the fastener 802 includes a finger grip flange 814 attached to the head 808. The flange 814 is preferably bulbous in cross-section, with the larger end of the bulb being disposed away from the convex surface of the head 808. As such, in cross-section, the fastener 802 having the flange 814 looks like a push-pin.

Figure 9:
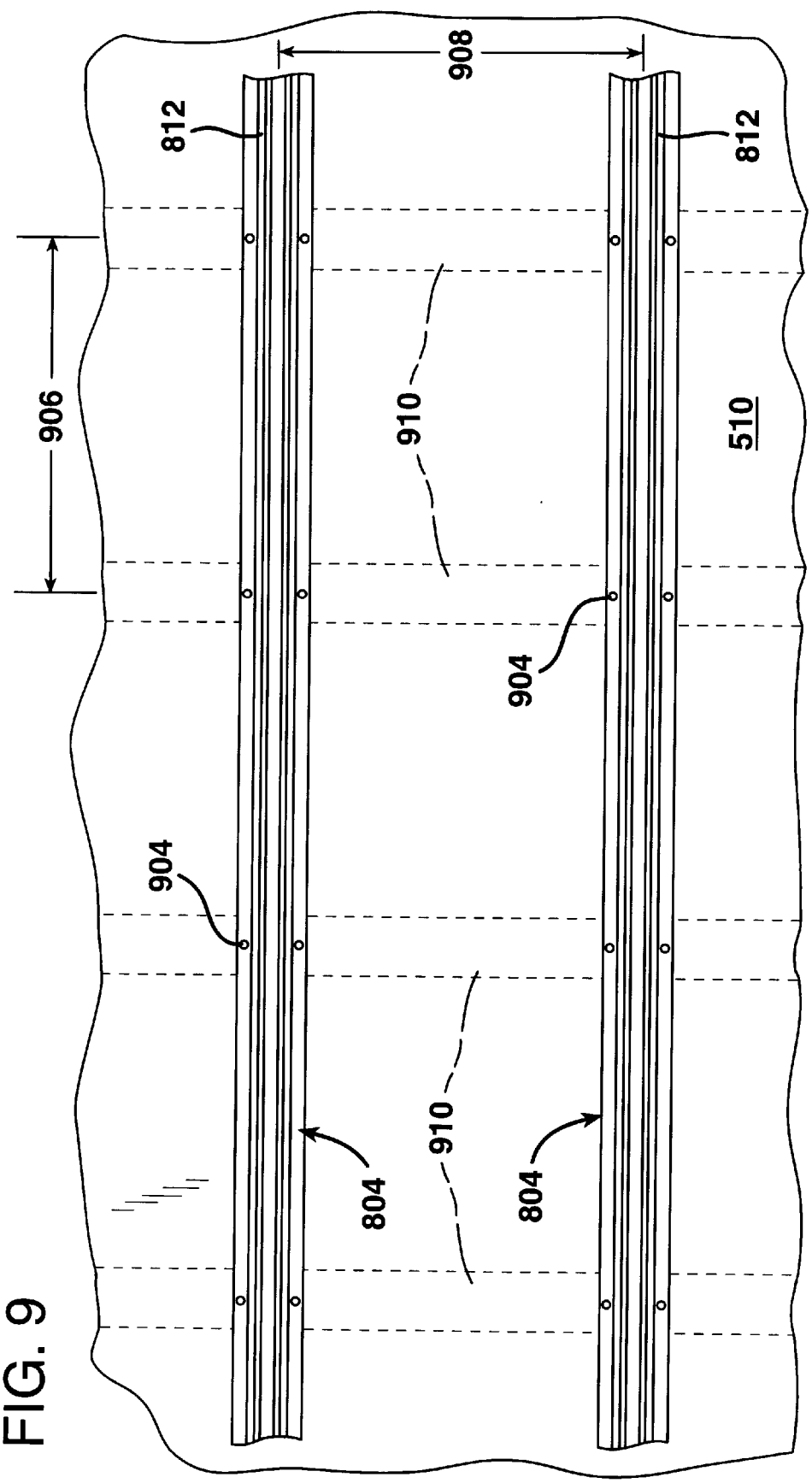
FIG. 9 is a plan view of the channels, according to the third embodiment, attached to a wall.

FIG. 9 is a plan view of a plurality of the channels 804 attached to the bare wall 510. The channels 804 are depicted as being attached to studs 910 within the wall 510 via typical fasteners 904, such as drywall screws or nails, e.g., with a fastener 904 located on either side of the channel 804, i.e., outside the sidewalls 812. The studs 910 are separated a uniform distance 916, typically 16 inches from center to center. The channels 810 are also uniformly space apart a distance 908, corresponding to a length or width of the panels 404. The channels 804 are mounted in essentially the same way as furring strips are mounted.

Like the heads 108 of the first and second embodiments, the head 808 of the third embodiment presents a small area of diffusion, which can be inconsistent with a goal of attaching panels having an absorptive surface. Again, however, the area of the head 808 is much smaller than the area of a typically-sized panel 404, so that the diffusion caused by the head 808 is considered negligible.

Figure 10:
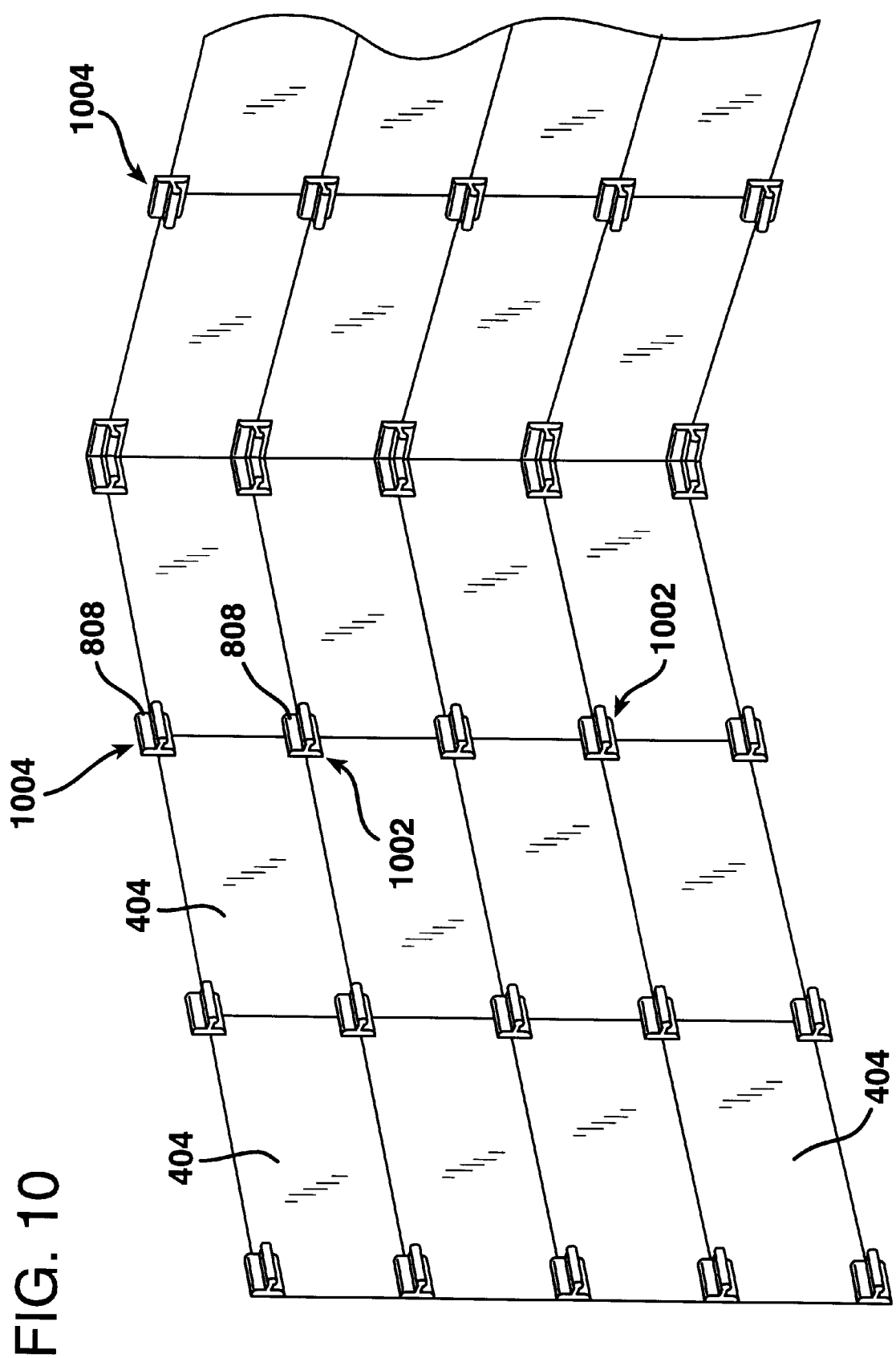
FIG. 10 is a three-quarter perspective view of a plurality of panels attached to the wall using the clamp assembly according to the third embodiment.

FIG. 10 is a three-quarter perspective view of a plurality of panels 404 attached to a bare wall (not depicted in FIG. 10 because obscured by the panels 404 and the heads 808) using the clamp assembly 800 according to the third embodiment. Because it is not easy to form a half-head (as in the first and second embodiments), a full head 808 overhangs the edge regions, examples of which are denoted by arrows 1004. Examples of heads covering the corners of four panels are denoted by arrows 1002.

Figure 15:
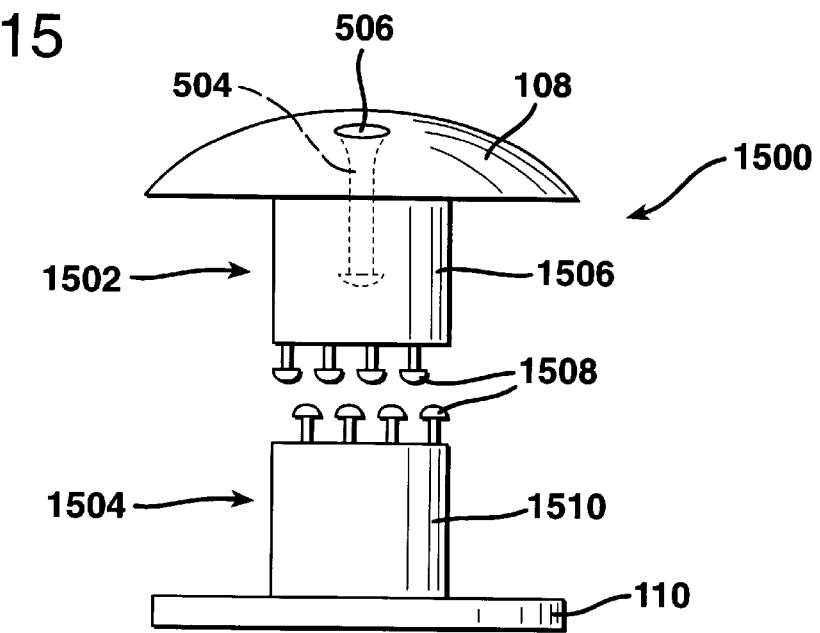
FIG. 15 is a cross-sectional view of a fourth embodiment, wherein the pull pin is retracted.

FIG. 15 is a cross-sectional view of a fourth embodiment of a clamp assembly according to the invention. The fourth embodiment is similar to the first and second embodiments. In FIG. 15, the resilient arms 106 and the receptacle 112 of FIG. 1 have been replaced by a first part 1502 and a second part 1504. The first part 1502 includes a first shank 1506 connected to the planar side of the head 108. Attached to an end of the first shank 1506, that is distal to the head 108, is a strip 1508 of mushroom-shaped stems. The second part 1504 includes a second shank 1510 connected to the planar side of the base 110. Attached to an end of the second shank 1510, that is distal to the base 110, is another strip 1508 of mushroom-shaped stems. The first part 1502 and the second part 1504 can be split in half, e.g., like the first and second embodiments.

The two strips 1508 of mushroom-shaped stems together form reclosable fastener pair. Such reclosable fastener technology is known, e.g., as marketed by the 3M Corporation under the trade name of the Dual Lock Industrial Fastener.

The pair of mushroom-shaped stem strips provide a rigid, strong connection when the mushroom-shaped stems are pushed together to the point that they interlock. This connection also provides torsional stability. Thus, the fourth embodiment shares these qualities with the first to third embodiments. However, the fourth embodiment is slightly different in that it provides less alignment than is inherent to the first to third embodiments.

Figure 16:
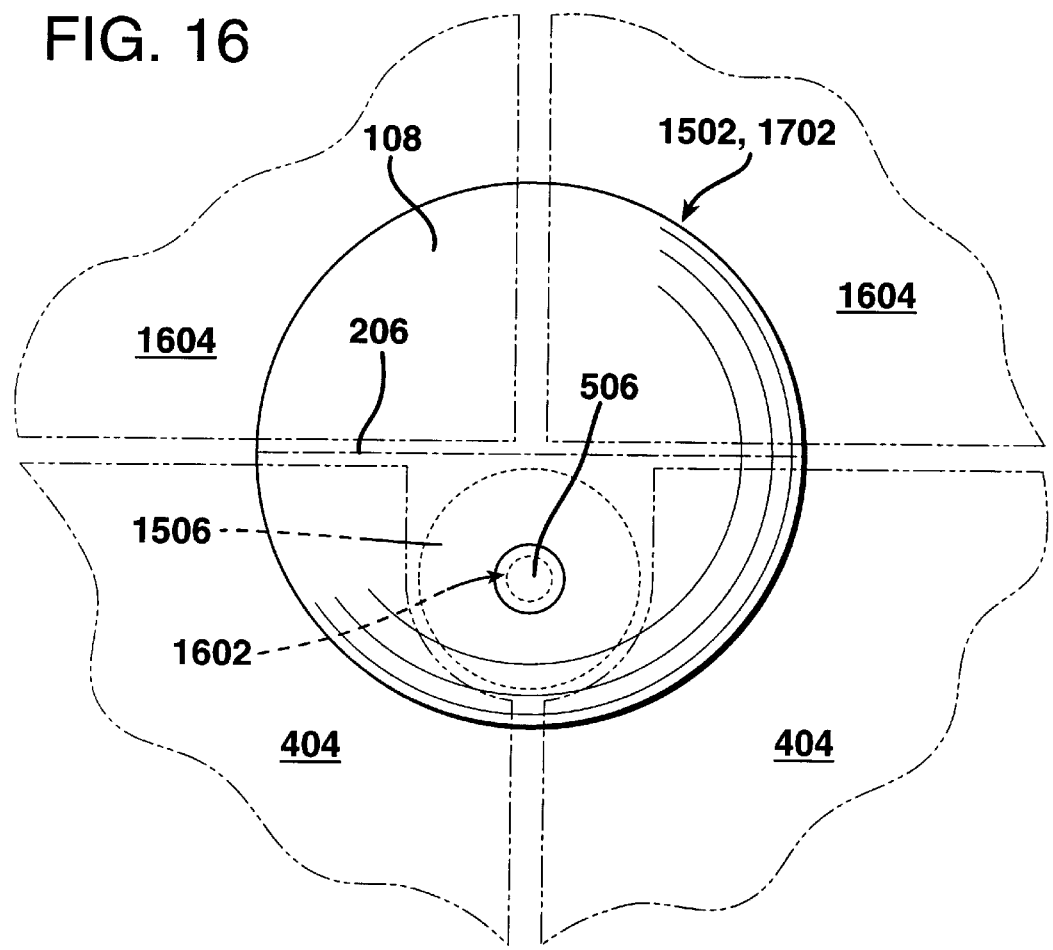
FIG. 16 is a top view of the fourth embodiment, as well as a fifth embodiment.

In FIG. 15, the pull pin 504 is depicted as being retracted. FIG. 16 is a top view of the fourth embodiment, as well as a fifth embodiment. The retracted pull pin 504 fits into a void 1602 in the first shank 1506. The first shank 1506 (and therefore the second shank 1510) is depicted as being circular in cross-section, but any shape can be used.

FIG. 15 also depicts an alternative way to configure panels that are attached by the clamp systems according to the invention. In FIG. 16, only the panels 404 are notched. The panels 1604 do not need to be notched at the corners because the first shank 506 is formed to one side of the line 206 of symmetry.

Figure 17:
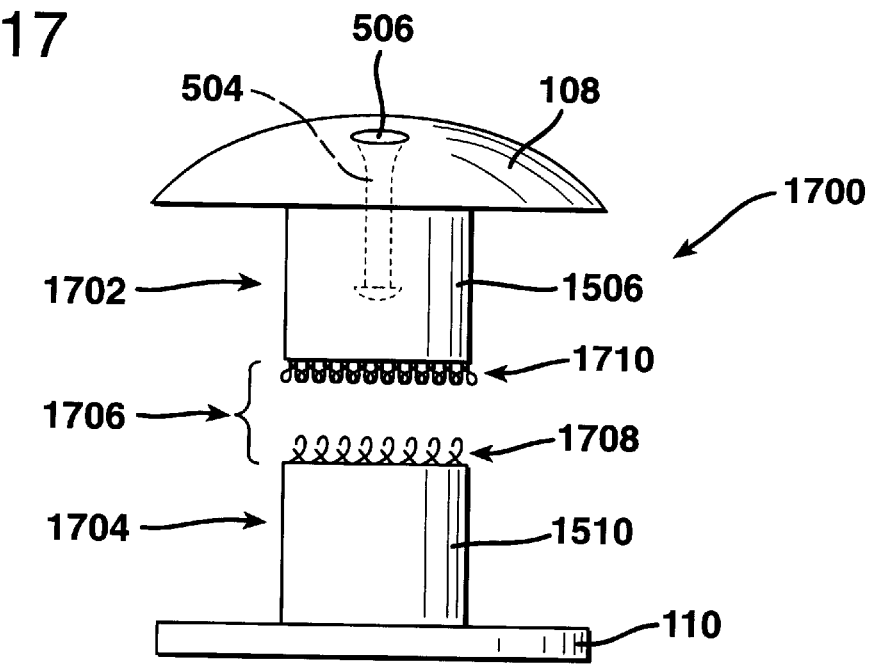
FIG. 17 is a cross-sectional view of the fifth embodiment, wherein the pull pin is retracted.

FIG. 17 is a cross-sectional view of the fifth embodiment of a clamp assembly according to the invention. FIG. 17 is similar to FIG. 15, except that the strips 1508 of mushroom-shaped stems have been replaced by a hook and loop fastener pair 1706, which defines a new first part 1702 and a new second part 1704.

The first part 1702 has a strip 1710 of loops attached to the end of the first shank 1506 that is distal to the head 108. The second part 1704 has a strip of hooks attached to the end of the second shank 1510. Such hook and loop reclosable fastener technology is known, e.g., as marketed by the 3M Corporation under the trade name of the Scotchmate Industrial Fastener.

As in FIG. 15, the pull pin 504 is depicted in FIG. 17 as being retracted. As noted above, FIG. 16 is a top view of the first part 1702 of FIG. 17 as well as the first part 1502 of FIG. 15.

Figure 18:
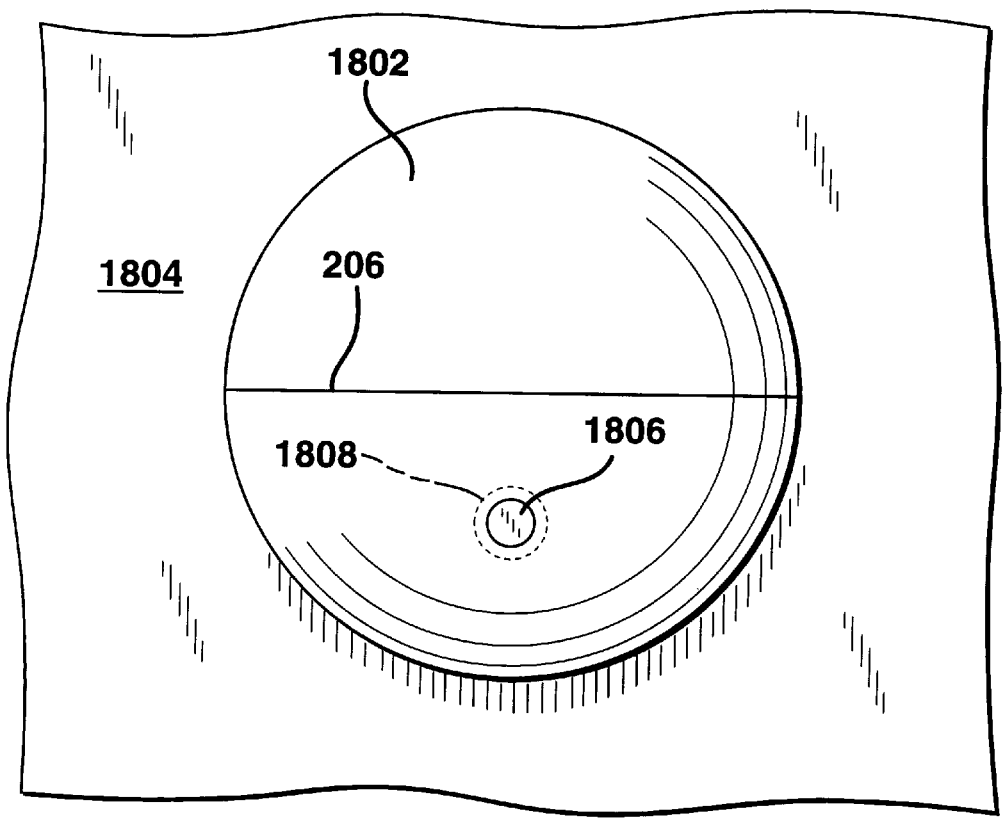
FIG. 18 is partial plan view of a panel attached to the wall via a fastener according to the invention.

FIG. 18 is partial plan view of a panel attached in a different way to a wall via a fastener according to the invention. In FIG. 18, a panel 1804 is attached to a wall (not shown) via a clamp assembly, of which the head 1802 is depicted. Any of the clamp assemblies according to the invention can be used. The panel 1804 has an aperture 1808 through which can pass a portion 1806 (corresponding to a shank, blade-like shank, resilient arms, etc.). The aperture can be located anywhere in the panel 1804, e.g., in the center.

Thus, the invention, among other things, provides a quick and easy technology for attaching, and facilitating reconfiguration (detaching and reattaching) of, panels to walls.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clamp assembly comprising:
   a first clamping piece; and
   a second clamping piece configured to cooperatively engage said first clamping piece;
   said first clamping piece including
      a base plate,
      a first shank attached to extend perpendicularly to said base plate, and
      a first member, of a reclosable fastener pair, attached to said first shank at an end distal to said base plate;
   said second clamping piece including
      a head plate,
      a second shank attached to extend perpendicularly to said head plate, and
      a second member, of said reclosable fastener pair, attached to said second shank at an end distal to said head plate;
   wherein said base plate and said head plate are parallel when said first member and second member are connected.

2. The clamp assembly of claim 1, wherein each of said first member and said second member is a strip of mushroom-shaped stems.

3. The clamp assembly of claim 2, wherein said reclosable fastener pair is a hook and loop fastener pair.

4. The claim assembly of claim 1, wherein each of said first clamping piece and said second clamping piece are integrally formed.

5. The clamp assembly of claim 1, wherein said first clamping piece and said second clamping piece are cooperatively engaged and characterized by a line of symmetry, said first shank and said second shank being positioned to a same side of said lines of symmetry, respectively.

6. The clamp assembly of claim 5, wherein an upper surface of said head plate is notched along said line of symmetry to promote detachment of a portion of said head plate opposite to a portion of said head to which said second shank is attached.

7. The clamp assembly of claim 5, wherein said base plate has at least two holes for attachment to a substrate.

8. The clamp assembly of claim 7, wherein said at least two holes are located on opposite sides of said line of symmetry.

9. The clamp assembly of claim 6, wherein said head plate includes a finger grip flange on the same side of said line of symmetry as said second shank.

10. The clamp assembly of claim 6, wherein said first clamping piece has a movable arm on the same side of said line of symmetry as said second shank, said movable arm being movable through said head plate between a first position for storing said arm and a second position for making said movable arm available as a finger grip.

11. The clamp assembly of claim 10, wherein said first position disposes said movable arm, to extend from said head plate toward a distal end of said second shank and said second position disposes said movable arm to extend from said head plate in a direction opposite to which said second shank extends.

12. The clamp assembly of claim 10, wherein said movable arm maintains said first position via a first detent arrangement with said head plate and said movable arm maintains said second position via a second detent arrangement with said head plate.

13. The clamp assembly of claim 1, wherein said head plate is plano-convex in cross-section.

* * * * *